Aug. 26, 1969    W. J. WEINFURT    3,463,932
UNDERGROUND DISTRIBUTION SYSTEM
Filed Dec. 12, 1966    2 Sheets-Sheet 1
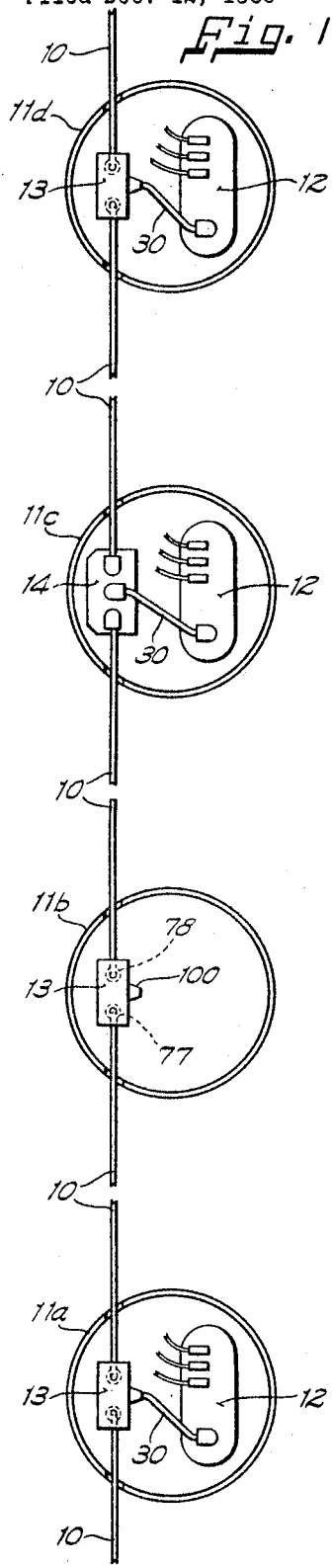
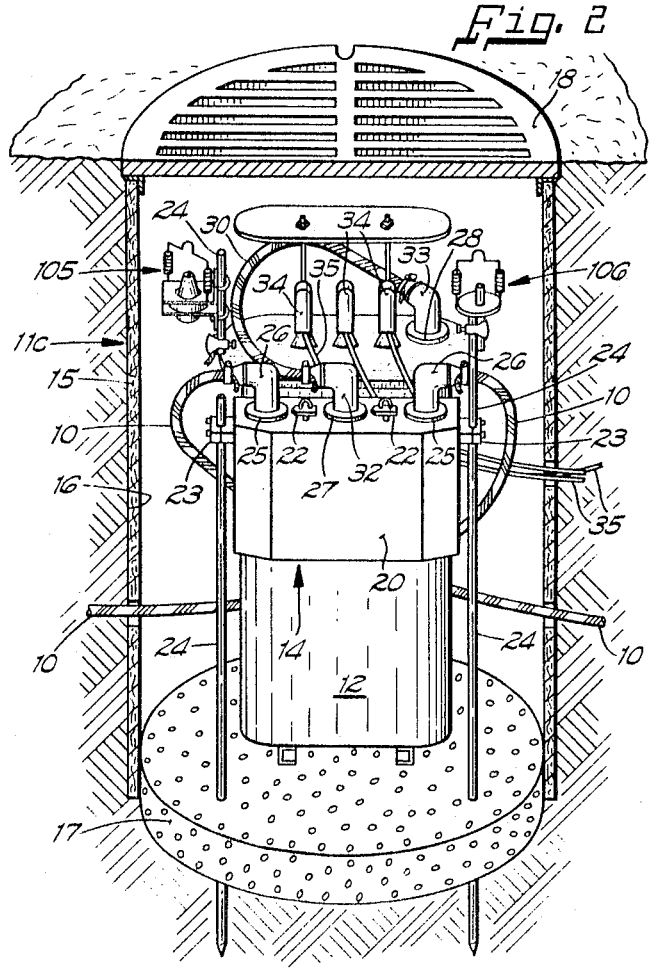
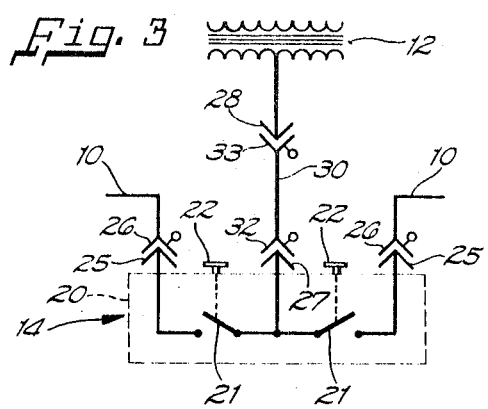
INVENTOR.
WILLIAM J. WEINFURT
BY Fred Winiott
ATTORNEY Aug. 26, 1969  W. J. WEINFURT  3,463,932
UNDERGROUND DISTRIBUTION SYSTEM
Filed Dec. 12, 1966  2 Sheets-Sheet 2
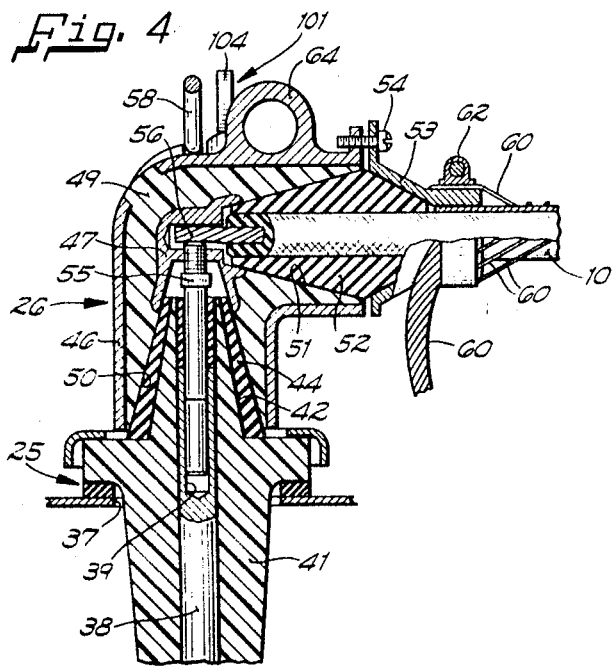
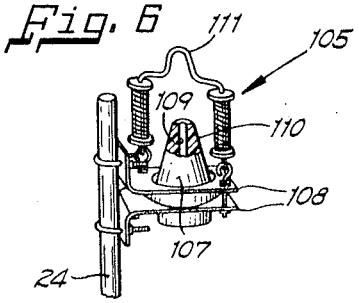
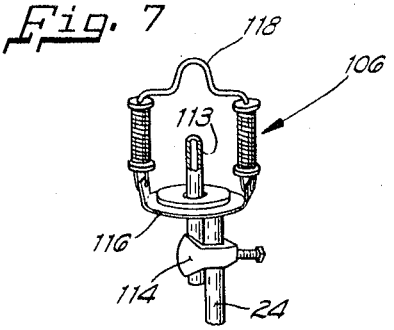
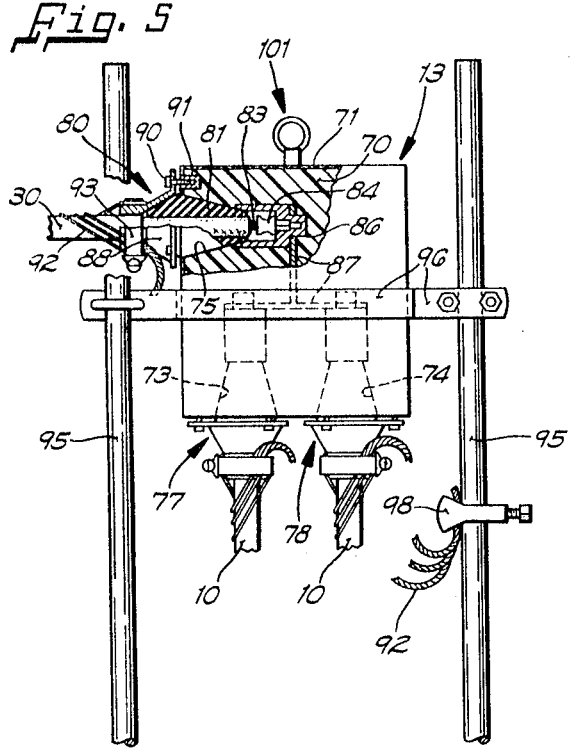
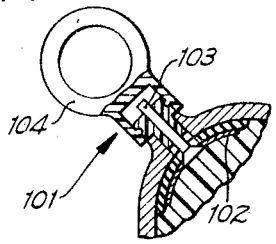
INVENTOR.
WILLIAM J. WEINFURT
BY Fred Wivirtt
ATTORNEY United States Patent Office 3,463,932
Patented Aug. 26, 1969

1

3,463,932
UNDERGROUND DISTRIBUTION SYSTEM
William J. Weinfurt, Elm Grove, Wis., assignor to Mc-
Graw-Edison Company, Milwaukee, Wis., a corpora-
tion of Delaware
Filed Dec. 12, 1966, Ser. No. 601,098
Int. Cl. H02j 3/04
U.S. Cl. 307—17                                    10 Claims

ABSTRACT OF THE DISCLOSURE

An underground distribution system for electrical power from one or more sources to several locations of consumption. This system includes a plurality of vault means, each having a surrounding side wall extending below ground level, a separate, sealed distribution transformer component supported within each of a plurality of the vault means independently of the side walls thereof, cable junction means disposed within each of the vault means independently of the side wall of the vault and the transformer, first primary cable means entering the vault means and terminating at the cable junction means whereby the cable junction means is connected to a source, and second primary cable means extending between the cable junction means and the transformer component. The junction means is independently grounded, and cable terminator means and connector means used in the system are all preferably substantially identical. Therefore, the system is versatile and interchangeable, and a great variety of arrangements can be made using standard component parts and a standard transformer component.

---

This invention relates to a new and improved underground distribution system.

Underground electrical distribution systems generally include a common high voltage conductor which supplies energy to a number of stepdown transformers which in turn deliver low voltage energy to widely spaced points of useage. The primary conductor of such system comprises a buried cable, and the transformers are located in vaults disposed below grade.

The proposed system dictates the disposition of various system components, such as sectionalizing switches and fuses. It has heretofore been the practice in such systems to incorporate these components into the transformer or, if separately housed, to place them in auxiliary vaults opening into the transformer vault. This practice limited design freedom and required the stocking of a large number of transformer and component assemblies to meet design demands. In addition, linemen trained primarily in overhead distribution practices generally find prior art underground systems more difficult to service.

It is an object of the invention to provide an underground distribution system in which a standard transformer may be located at each distribution location.

Another object of the invention is to provide an underground system wherein the arrangement of system components at any transformer location can be modified independently of the transformer.

A further object of the invention is to provide an underground system which may be serviced and maintained by procedures analogous to conventional overhead distribution practices.

These and other objects and advantages will become more apparent from the detailed description of the invention taken with the accompanying drawings in which:

FIG. 1 schematically illustrates an underground distribution system according to the instant invention;

FIG. 2 illustrates one of the vaults in the distribution system shown in FIG. 1;

2

FIG. 3 schematically illustrates the switch assembly shown in FIG. 2;

FIG. 4 is an example of a cable termination which may be employed with the components of the system illustrated in FIGS. 1 and 2;

FIG. 5 illustrates a cable junction employed in the system illustrated in FIG. 1;

FIGS. 6 and 7 illustrate in greater detail the support stands shown in FIG. 2; and FIG. 8 illustrates a test plug on the connector of FIG. 4.

In general terms the invention comprises a system for underground distribution of electrical power from one or more sources to a plurality of locations of consumption wherein the system includes a plurality of vault means each having a surrounding side wall extending below ground level and arranged to receive a distribution transformer independently of the side wall thereof, a cable junction adopted to be supported within each of vault means independently of the side wall and the transformers, first primary cable means entering each vault means and terminating at the cable junction whereby said cable junction is connected to a source, and a transformer lead means extending between each transformer and its associated cable junction.

Referring again to the drawings in greater detail, FIG. 1 shows an underground distribution system according to the instant invention to include a primary cable 10 which may be connected at one end to a source of power if the system is radial or at both ends if it is part of a loop system. A plurality of vaults 11a, 11b, 11c and 11d are located at various widely spaced points of useage as the demands of the system dictate.

A transformer 12 may be located in certain of the vaults 11a, 11c and 11d, for example, to satisfy the immediate needs of the system. Even though a transformer is not immediately required in vault 11b, the vault is installed so that it will not be necessary to return power excavating equipment to the scene at some later date.

A junction device is disposed in each of the vaults 11a, 11b, 11c and 11d and each is constructed and arranged to be connected into the cable 10. Certain of the junction devices, indicated by the reference numeral 13, may comprise three terminal cable junctions which allow the transformers 12 to be tapped into the primary cable 10 without physical disruption thereof. The cable junction 13 located in the vault 11b provides a cable splice and will allow a transformer to be connected to the cable 10 when the need arises. In this cable junction the connector opening that would normally accept the transformer lead is plugged.

The junction device located in the vault 11c may comprise a sectionalizing switch 14 which permits portions of the primary cable to be isolated from one or both of the sources.

FIG. 2 shows the vault 11c in greater detail to include a generally tubular open-ended vault member 15 composed of any suitable material such as bituminous fiber and which is disposed in a prepared excavated opening 16. The floor of vault 11c may be covered with gravel 17 for supporting the transformer 12 independently of the vault member 15. A grate 18 covers the exposed upper end of the vault member 15 to provide ventilation and prevent tampering.

As shown in FIGS. 2 and 3, the switch 14 may comprise an outer metallic tank 20 which may enclose, for example, two single throw oil switches 21 which are operable externally from the tank 20 by hookstick receivable operating handles 22. Switch 14 is supported within the vault 11c by means of a pair of brackets 23 affixed at each of the opposite sides of tank 20 and each of which engages metallic conductive supporting ground rods 24 which are driven into the floor of the excavation 16. The ground rods 24 not only serve to support the switch 14 but also ground the metallic switch tank 20.

Switch 14 is placed in circuit with the primary cable 10 by means of a pair of outer bushings 25 which extend through the cover of the tank 20 and each of which is constructed and arranged to receive cable connectors 26 affixed to the ends of the primary cable 10. The third bushing 27 of switch 14 is connected to the primary bushing 28 of transformer 12 by a transformer lead 30 which has identical connectors 32 and 33 at each end for engagement with said bushings 27 and 28, respectively. The transformer 12 may also include secondary bushings 34 which are connected by buried conductors 35 to the load circuit (not shown).

Each of the primary bushings 25, 27 and 28 are identical as are their mating connectors 26, 32 and 33. For the sake of brevity, therefore, only one of the bushings 25 and its co-acting connector 26 will be discussed in detail.

In general terms, the bushing 25 is shown in FIG. 4 to pass through suitable opening 37 in the tank 20 and to include a central stud 38 which terminates at its upper end in a female connection portion 39 and which is surrounded by suitable insulation 41. The upper end of the insulation 41 defines a frustoconical surface 42 which may receive a collar portion 44 of resilient insulating material.

The connector 26 includes an outer hollow metallic conductive elbow member 46 which is open at both ends and a radially spaced inner conductive connector member 47. The gap between the members 46 and 47 is filled by insulation 49 which has a first concave frustoconical surface 50 opening into one end for receiving the upper end of the bushing 25 and a second concave frustoconical surface 51 opening into its other end for receiving a double-ended frustoconical gland member 52 mounted on the end of the cable 10. The other end of member 46 is closed by a frustoconical metallic stress relief member 53 which is complementary to the gland member 52 and which is electrically and mechanically connected to the member 46 by screws 54. In addition, a male connection member 55 is threadably affixed to the inner member 47 and extends axially downwardly through the open upper end of the bushing 25 for releasable engagement with the female connection portion 39. The member 55 also releasably engages the conductor portion 56 of the cable 10 which extends into the open end of the inner member 47.

A spring member 58 engages the housing 20 at its lower end and the connector 26 at its upper end for releasably securing the connector 26 to the bushing 25 and for providing electrical connection between the metallic outer member 46 and the casing 20. In addition, the force of the spring 58 tends to compress the resilient insulation 44 between the surfaces 42 and 50 so as to provide a fluidtight connection and to reduce low dielectric strength air gaps along the creepage path between the members 46 and 47. The ground strands 60, which surround the primary cable 10, are connected to the frustoconical stress relief member 53 by means of a ring clamp 62 so that a continuous electrical ground path is provided.

The spring 58 is constructed to be engaged by a hook stick so that it can be released from the connector 26 which may then be released from the bushing 25 by engaging a hook stick in an integral eye 64.

The details of the connector illustrated in FIG. 4 form no part of the instant invention and, accordingly, have merely been discussed in general terms. For a more complete description of the connector, reference is made to co-pending application Ser. No. 571,495, filed Aug. 10, 1966, and assigned to the assignee of the instant invention.

FIG. 5 shows that the cable junction 13 may comprise a rectilinear body of insulating material 70 which may have a conductive coating 71. The junction 13 is provided with a plurality of connector receptacles 73, 74 and 75 for respectively receiving connectors 77 and 78 mounted on the primary cable 10 and connector 80 on the transformer lead 30.

Each of the receptacles 73, 74 and 75 and connectors 77, 78 and 80 are identical so that only receptacle 75 and connector 80 will be discussed in detail.

Connector 80 includes a double-ended frustoconical resilient gland member 81 which is identical to the connector gland 52 and which mates with the frustoconical surface of the receptacle 75. The exposed end 83 of the transformer lead 30 carries a connector member 84 which releasably engages a complementary metallic connector member 86 disposed at the base of receptacle 75 and which is electrically connected by conductive means 87 to the corresponding connecting members of each of the other receptacles 73 and 74. Connector 80 also includes a frustoconical conductive metallic stress relief member 88, which is identical to the member 53 of connector 26, and which is releasably securable to the member 70 by screws 90 which threadably engage metallic insert members 91. The stress relief members 88 serve to hold connectors in position and to compress the gland member 81 against the surface of receptacle 75 to provide a fluidtight joint and to eliminate low dielectric strength air gaps along the mating surfaces. The ground conductive strands 92, disposed around the transformer lead 30, are electrically connected to the member 88 by a ring clamp 93 to provide a continuous ground path between the junction 13 and the strands 92.

The junction 13 is mounted in its respective vault by means of ground rods 95 which are driven into the floor of the vault and which are supportingly engaged by a conductive strap 96 affixed to the junction 13. In addition, the loose ends of the ground strands 92 may be affixed to one of the ground rods 95 by a clamp 98.

For a more complete description of the junction 13, reference is made to co-pending application Serial No. 599,499, filed December 6, 1966, and assigned to the assignee of the instant invention.

It will be appreciated from the foregoing description that the termination of the primary cables 10 and the transformer leads 30 at the junctions 13, the switch 14 and the transformers 12 consist of identical double-ended gland members 52 or 81 and hollow frustoconical stress relief members 53 or 88. As a result, there is a complete interchangeability of these connections as changes in system requirements dictate. Consider, for example, the vault 11b of FIG. 1. Here it can be seen that the primary cable 10 is connected to the junction 13 by connectors 77 and 78. However, because there is no transformer in this vault, a solid plug 100 is employed in the receptacle 75. Should a transformer be required in vault 11b at a later date, the transformer primary lead may be connected into receptacle 75 in the manner discussed hereinabove without modifying or replacing the junction 13.

Should a switch 14 be required in any of the vaults 11a, 11b or 11d in place of the junctions 13, the connectors 77, 78 and 80 can be removed from the junction 13 which is then removed from the vault. The connector members 84 on the ends of each of the cable conductors are then removed, whereupon the cable conductors may be connected into the connector of FIG. 4 by turning the connector member 55. The hollow stress relief members are then affixed by screws 54, whereupon the connector 26 may be applied to the bushings of a switch 14.

Because the junctions 13 and the switch 14 are mounted on ground rods, changes in these components may be made independently of the transformers 12 and the vaults. As a result, a standard transformer and vault may be used at each location.

Each of the junctions 13 and each of the connectors 26, 32 and 33 is provided with a test plug 101 which permits a determination of whether the components are energized. Each test plug is shown in FIG. 8 to include a metallic electrode 102 disposed beneath the insulation 49 and a probe member 103 which extends outwardly through and insulated from the member 46. The electrode 102 is capacitively coupled to the inner conductive member 47. A cap 104, which may be removed by a hook stick, covers the probe 103 when the latter is not in use. For a more complete description of such test plugs, reference is made to said co-pending application Ser. No. 571,495.

FIG. 2 also illustrates that the ground rods 24 may also support an insulated support stand 105 or a grounded support stand 106 for supporting the connectors 26, 32 or 33 after the latter have been removed from their respective bushings. The insulating support stand 105 is shown in FIG. 6 to include a frustoconical insulating member 107 mounted on a pair of support plates 108 which are suitably affixed to the ground rod 24. The member 107 has a longitudinal bore 109 for receiving the connector member of the connector 26, 32 or 33 and a frustoconical surface 110 complementary to the surface 50 on said connectors. In addition, a spring member 111, which is identical to the spring member 58 on the bushings 25, 27 and 28, is provided to secure a connector in position on the support stand 105. The surface 110 is complementary to the surface 50 on the connectors 26, 32 and 33 and coacts therewith in the same manner that said surface coacts with its respective bushing. The bore 109 is closed at its lower end for isolating the connector member 55 from the plates 108 and the ground rod 24.

The ground stand 106 is illustrated in FIG. 7 as including a conductive connector member 113, which is identical to the connector portion 39, on the upper end of each bushing stud 38 for receiving the connector member 55 on the connectors 26, 32 or 33. Connector member 113 is secured to the ground rod 24 by a suitable clamp 114 and includes a horizontal plate 116 for supporting the conductive member 26, 32 or 33 and an identical spring 118 for securing the latter in position.

The insulated support stand 105 provides a visible open connection and a support for an energized connector. The grounded support stand 106 also provides a visible open and a visible ground on underground circiuts. The support stands 105 and 106, as well as the test plugs 101, allow safe operation and maintenance in the system. In addition, the interconnections of the conductor ground strands 60 and 92 with the various ground rods and component housings insure that all exposed portions of the system will be grounded. In this manner a lineman schooled in overhead distribution practices can safely operate in the illustrated underground system.

While only a few embodiments of the invention have been shown and described, others will become apparent once the inventive concept is known. In addition, while the invention has been illustrated with respect to a switch, those skilled in the art will appreciate that other types of protective devices, such as fuses and lightning arresters, may also be used.

I claim:
1. A system for underground distribution of electrical power from one or more sources to a plurality of locations of consumption, said system including
   a plurality of vault means each having a surrounding side wall extending below ground level;
   a separate, sealed distribution transformer component supported within each of a plurality of said vault means independently of the side wall thereof, said transformer component having exterior primary connector bushing means and secondary load connector means;
   junction means disposed within each of said vault means having support means independent of said side wall and said transformer, said junction means being independently grounded;
   first primary cable means entering said vault means and terminating at said junction means whereby said junction means is connected to a source; and
   second primary cable means extending between said junction means and said primary connector bushing means of said transformer component.

2. The system set forth in claim 1, wherein
   certain ones of said junction means include a cable junction, first cable terminator means releasably connecting said first primary cable menas to said cable junction, and second cable terminator means releasably connecting one end of said second primary cable means to said cable junction;
   a third cable terminator means at the other end of said second primary cable means;
   and a first connector means releasably connecting said third cable terminator means to said primary connector bushing means.

3. The system set forth in claim 2, wherein
   certain other of said junction means comprise a sectionalizing switch having a plurality of bushing means, fourth cable terminator means on said fisrt primary cable means and one end of said second primary cable means, and second connector means releasably connecting said fourth cable terminator means to said bushing means of said sectionalizing switch.

4. The system set forth in claim 2, wherein all of said cable terminator means are substantially identical.

5. The system as set forth in claim 3, wherein all of said cable terminator means are substantially identical, wherein all of said connector means are substantially identical, and wherein all of said bushing means are substantially identical.

6. The system of claim 1, wherein said independent grounding is provided by ground rod means driven into the earth underlying the vault bottom.

7. The system of claim 1, wherein said support means for said junction means comprises ground rod means driven into the earth underlying the vault bottom, the said ground rod means providing the independent grounding of said junction means.

8. The system set forth in claim 1, wherein insulating support means is disposed in certain of said vault means for supporting the connector means in an insulated relation and independently of the transformer or junction means, when said connector means has been removed from operating position during servicing.

9. The system set forth in claim 1, wherein grounded support means is disposed in certain of said vault means for supporting the connector means in a grounded relation and independently of the transformer or junction means, when said connector means has been removed from operating position during servicing.

10. The system of claim 1, wherein each of said junction means and said connector means includes as an integral portion thereof a test point capacitively coupled to primary circuit elements within said junction means and said connector means for determining whether said primary cables are energized.

References Cited

UNITED STATES PATENTS

| | | | |
|---|---|---|---|
| 2,184,574 | 12/1939 | Addie | 174—37 X |
| 3,287,566 | 11/1966 | Lang et al. | 307—17 |
| 3,341,718 | 9/1967 | Acker | 307—17 X |
| 3,343,153 | 9/1967 | Waehner | 340—252 |
| 3,377,487 | 4/1968 | McNulty | 307—17 |
| 3,388,299 | 6/1968 | Brideweser et al. | 174—37 X |

ROBERT K. SCHAEFER, Primary Examiner

H. J. HOHAUSER, Assistant Examiner

U.S. Cl. X.R.

174—37